United States Patent [19]

Gauronski et al.

[11] Patent Number: 5,206,735
[45] Date of Patent: Apr. 27, 1993

[54] JOB INTERRUPT FOR ELECTRONIC COPYING/PRINTING MACHINES

[75] Inventors: John F. Gauronski, Rochester, N.Y.; Acco Hengst, Lewisville, Tex.; Alane H. Rowold, Rochester, N.Y.

[73] Assignee: Xerox Corporation, Stamford, Conn.

[21] Appl. No.: 859,266

[22] Filed: Mar. 25, 1992

Related U.S. Application Data

[63] Continuation of Ser. No. 546,606, Jun. 29, 1990, abandoned.

[51] Int. Cl.⁵ .................... H04N 01/21; G03G 21/00
[52] U.S. Cl. .................................. 358/296; 358/437; 355/313
[58] Field of Search ............... 355/313, 314; 358/296, 358/300, 437, 444, 468, 498

[56] References Cited

U.S. PATENT DOCUMENTS

| | | | |
|---|---|---|---|
| 4,273,439 | 6/1981 | Markham et al. | 355/313 |
| 4,297,025 | 10/1981 | Bach et al. | 355/313 |
| 4,302,782 | 11/1981 | Gunning et al. | 358/296 |
| 4,310,235 | 1/1982 | Lorenzo et al. | 355/313 X |
| 4,344,697 | 8/1982 | Matsumoto et al. | 355/313 |
| 4,511,928 | 4/1985 | Colomb | 358/280 |
| 4,563,706 | 1/1986 | Nagashima | 358/280 |
| 4,579,443 | 4/1986 | Abuyama et al. | 355/313 X |
| 4,673,990 | 6/1987 | Okada | 358/296 |
| 4,678,316 | 7/1987 | Abuyama | 355/313 |
| 4,711,556 | 12/1987 | Abuyama | 355/314 |
| 4,825,296 | 4/1989 | Wabensonner et al. | 358/280 |
| 4,829,468 | 5/1989 | Nonaka et al. | 364/900 |
| 4,903,146 | 2/1990 | Nakahara | 358/498 X |
| 4,918,490 | 4/1990 | Stemmle | 355/318 |
| 4,947,345 | 8/1990 | Paradise et al. | 364/519 |
| 4,956,667 | 9/1990 | Gartner | 355/202 |
| 4,958,232 | 9/1990 | Sugiura et al. | 358/300 |

FOREIGN PATENT DOCUMENTS

| | | |
|---|---|---|
| 0055369 | 7/1982 | European Pat. Off. . |
| 0262603 | 4/1988 | European Pat. Off. . |
| 0366425 | 5/1990 | European Pat. Off. . |

OTHER PUBLICATIONS

Armonk, "Multi-Task Management Algorithm For a Printer", Jan. 1988, *IBM Technical Disclosure Bulletin*, vol. 30, No. 8, pp. 135-136.

W. B. Elliott et al., "Printer Performance Improvement", Aug. 1982, *IBM Technical Disclosure Bulletin*, vol. 25, No. 3B, pp. 1380-1384.

*Primary Examiner*—Benjamin R. Fuller
*Assistant Examiner*—Eric Frahm
*Attorney, Agent, or Firm*—Frederick E. McMullen; Lisa M. Yamonaco; Gary B. Cohen

[57] ABSTRACT

An electronic printer with a scanner for scanning the document pages of a job and converting the document images scanned to pixels, a printer for making prints of the documents from the pixels in accordance with job programming instructions, the scanner and printer operating asynchronously with respect to one another, and interruption of a job to process a special job is effected by interrupting the job currently being scanned by the scanner to scan the special job while continuing printing of other jobs in the print queue, and when the special job is ready, interrupting the job being printed to print the special job while resuming scanning of the interrupted job, and then continuing the printing of the interrupted job upon completion of the special job.

14 Claims, 14 Drawing Sheets

JOB INTERRUPT FOR ELECTRONIC COPYING/PRINTING MACHINES

This is a continuation of application Ser. No. 07/546,606, filed Jun. 29, 1990 now abandoned.

This invention relates to electronic copying/printing systems, and more particularly, to a job interrupt process for enabling jobs to be temporarily interrupted in order for a special job to be processed ahead of jobs in process.

Electronic printing systems typically employ a scanner for scanning image bearing documents and converting the image to image signals or pixels for use in making prints. The job stream usually consists of a quantity of jobs being scanned and printed consecutively without disturbance in the job stream flow. In some cases however, a special job must be processed before a job already in the job stream mandating an interruption of the scan or print process. For example, an operator may require the completion of a small special job right now but the system may be processing a longer job that may take hours to complete. In this and the multiple other situations in which the processing of consecutive jobs must be disturbed, it would be highly desirable if a system or procedure allowed these special cases to be handled expeditiously and efficiently existed.

In the prior art, U.S. Pat. No. 4,673,990 to Okada discloses a printer having control means to temporarily stop a print operation, with printing continued until paper that has been fed is processed, at which time printing is stopped, ready for restart at the point interrupted. U.S. Pat. No. 4,511,928 to Colomb discloses a printing system and method with print while store capability allowing printing to take place while image data is still being gathered. U.S. Pat. No. 4,825,296 to Wagensonner et al discloses a copy method and apparatus providing three memories that allow images to be held while the images are displayed prior to printing to determine if image quality is satisfactory. U.S. Pat. No. 4,563,706 to Nagashima discloses an image forming system wherein multiple inputs, outputs, and memories allow processing of multiple images simultaneously.

In contrast, the present invention provides a job interrupt process for an electronic printer comprising the steps of: temporarily interrupting scanning of the job currently being scanned to commence scanning of a special job; continuing printing of the job then in process; when scanning of the special job is completed or at least sufficient to enable printing of the special job to be started, interrupting printing of the job then in process to start printing the special job; resuming scanning of the job that was interrupted when scanning of the special job is completed; and resuming printing of the job that was interrupted when printing of the special job is completed.

IN THE DRAWINGS

Figure 1:
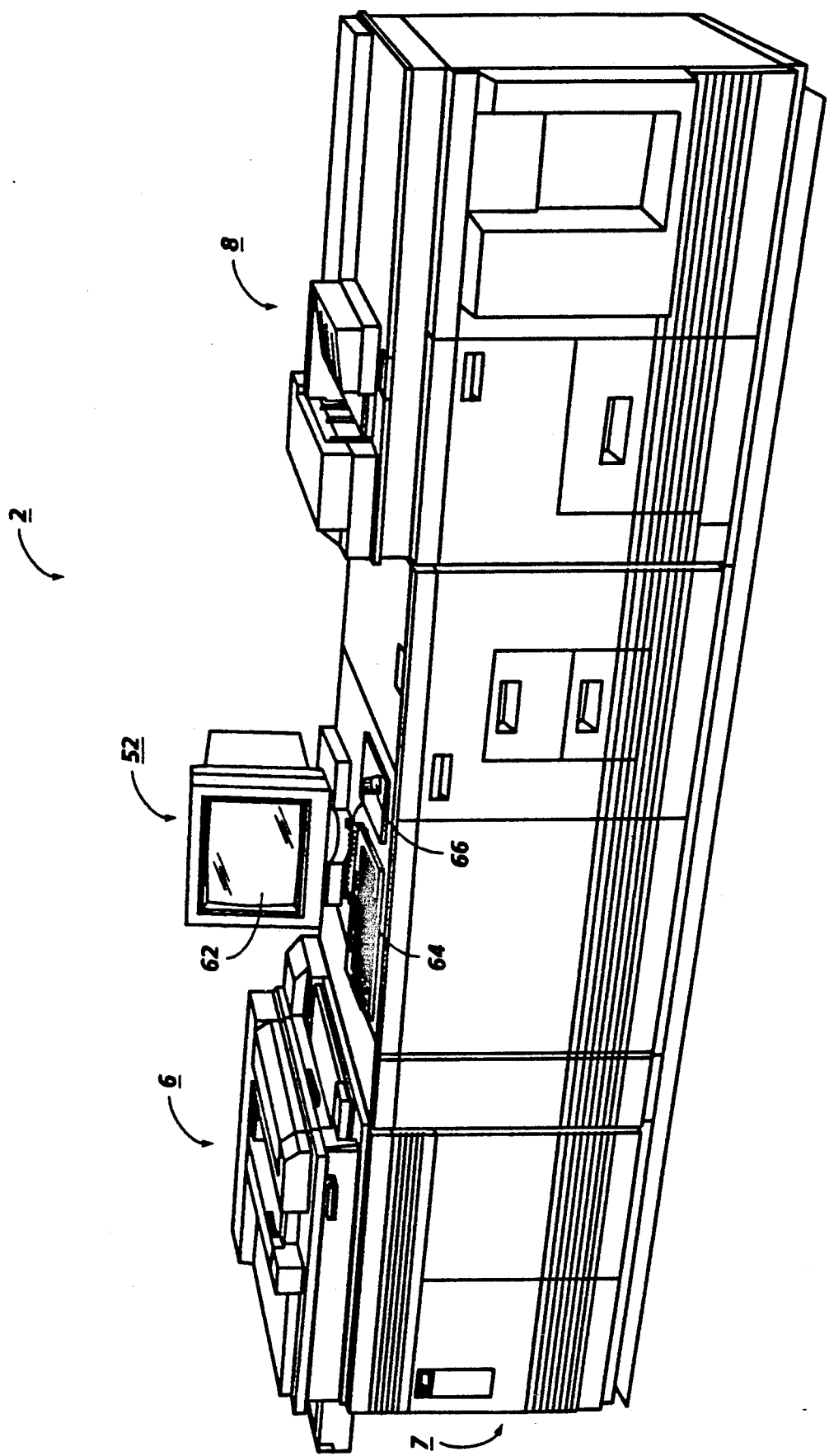
FIG. 1 is a view depicting an electronic printing system incorporating the print media identification system of the present invention.
Figure 5A:
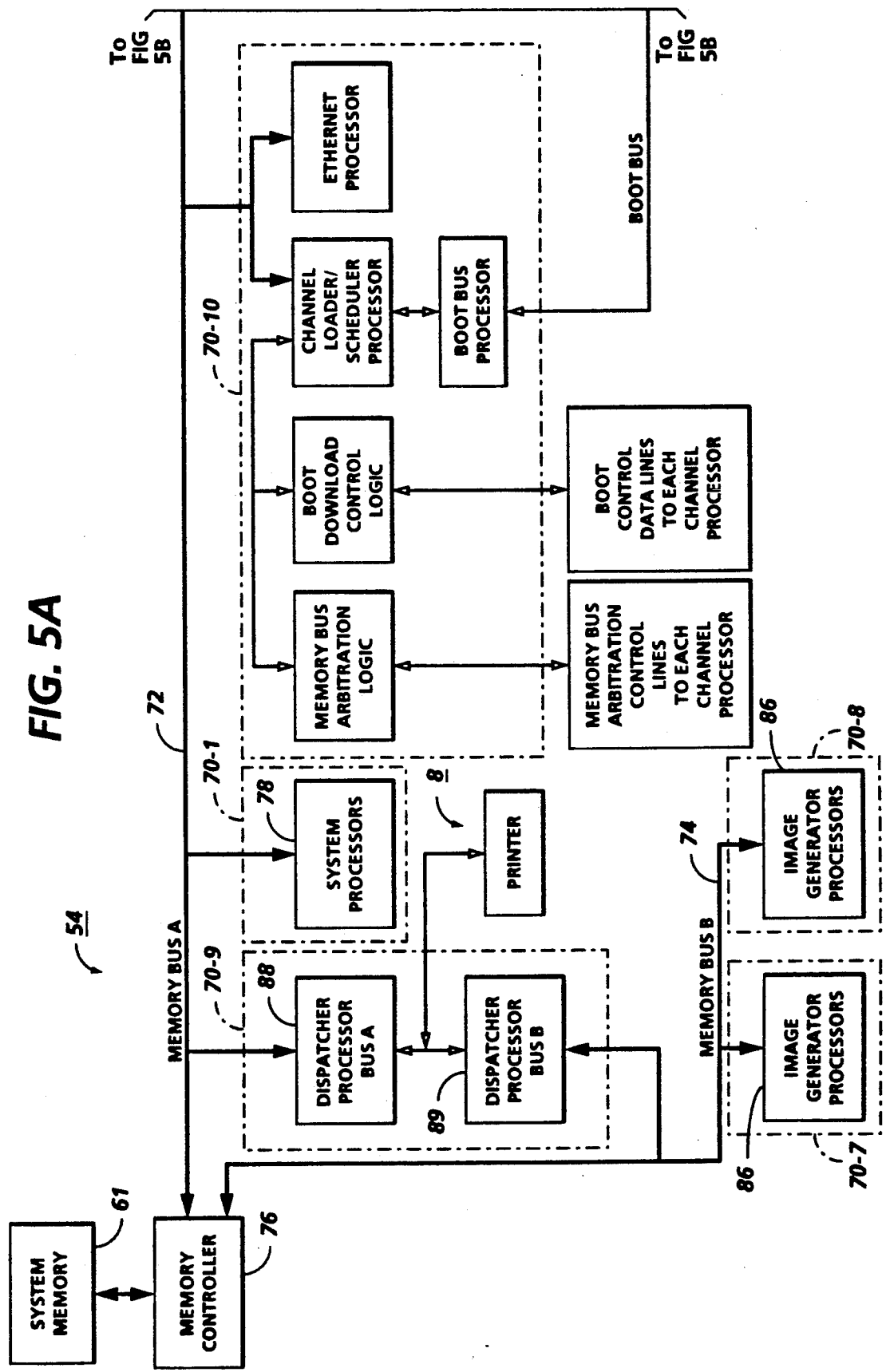
Figure 5B:
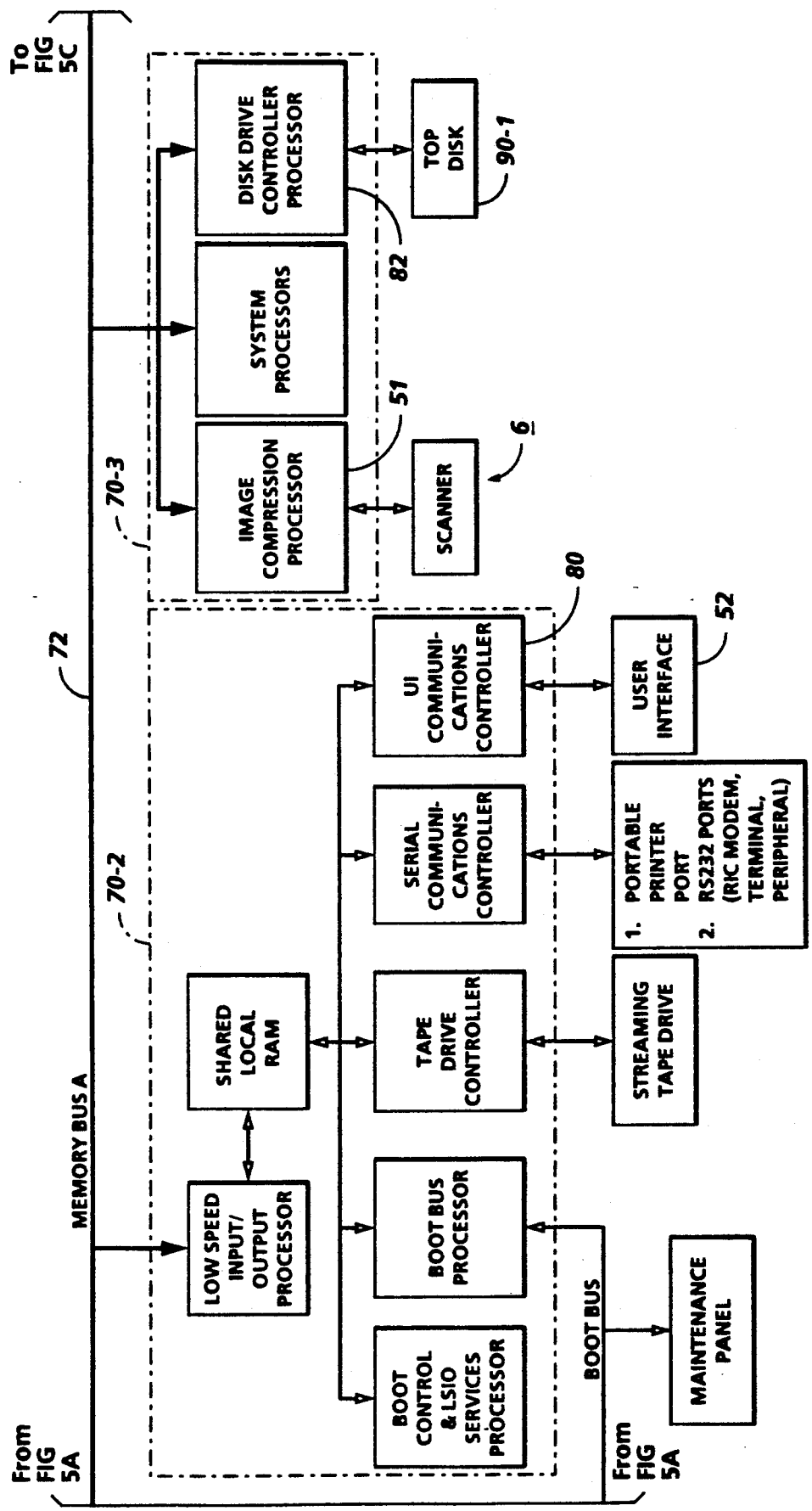
Figure 5C:
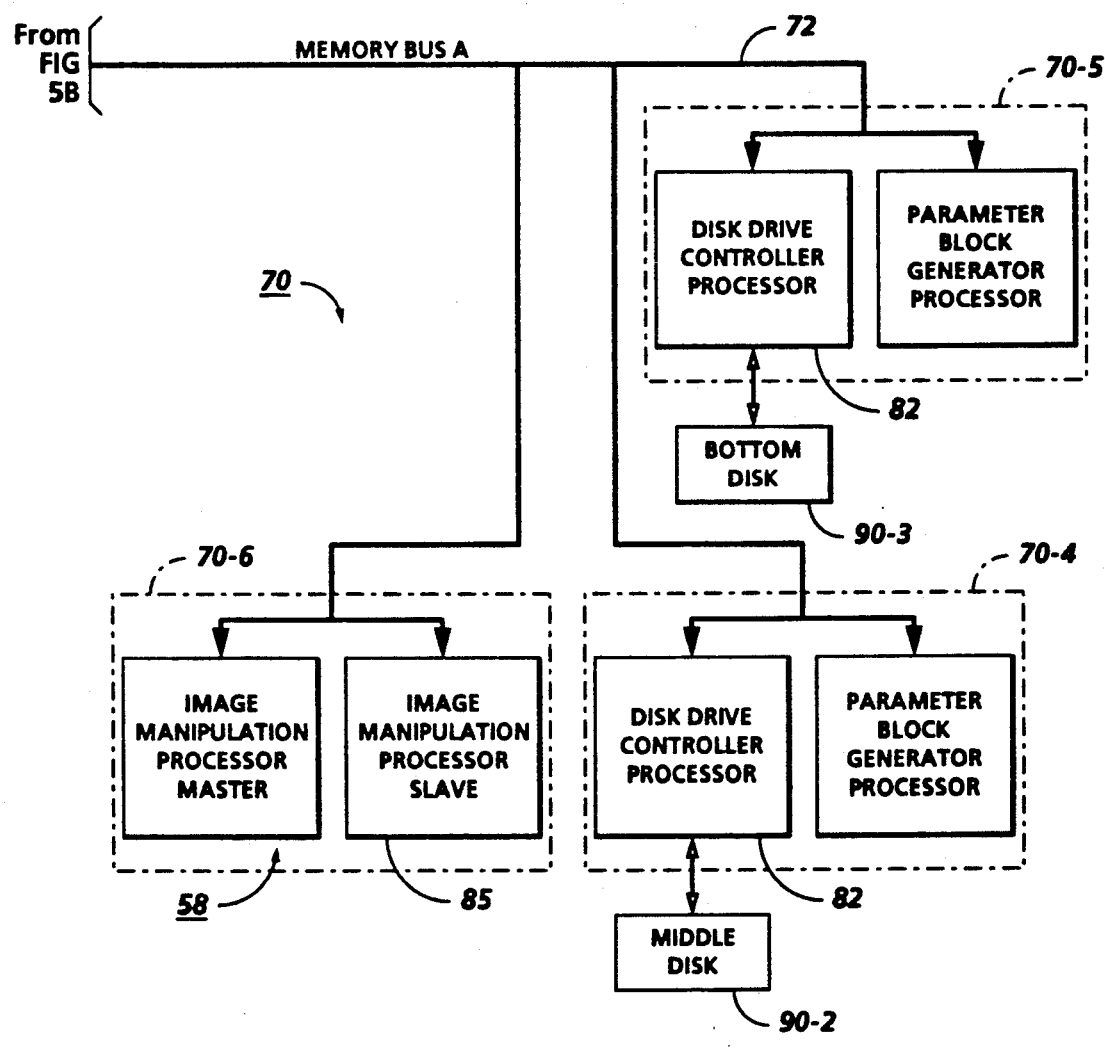
Figure 6:
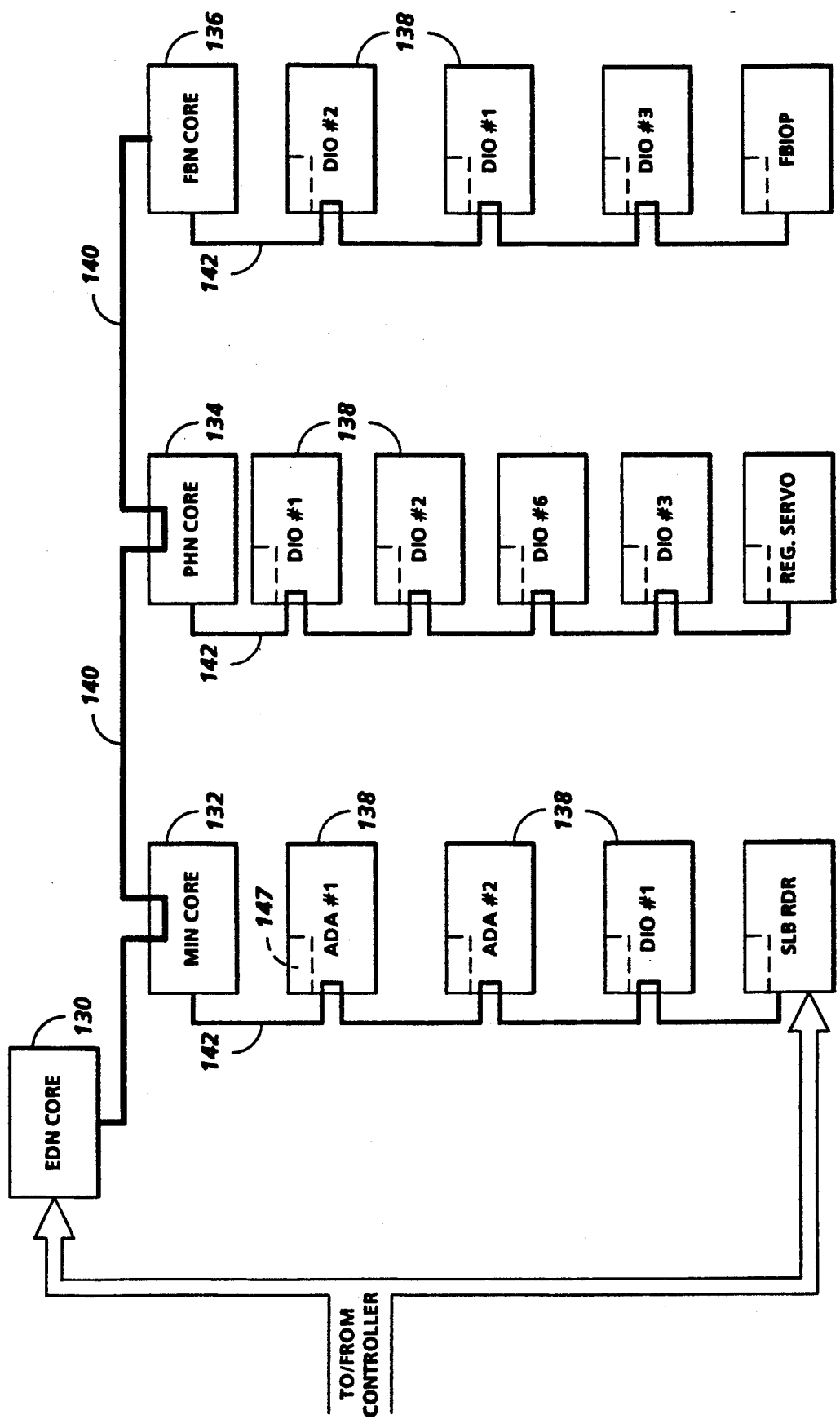
Figure 7:
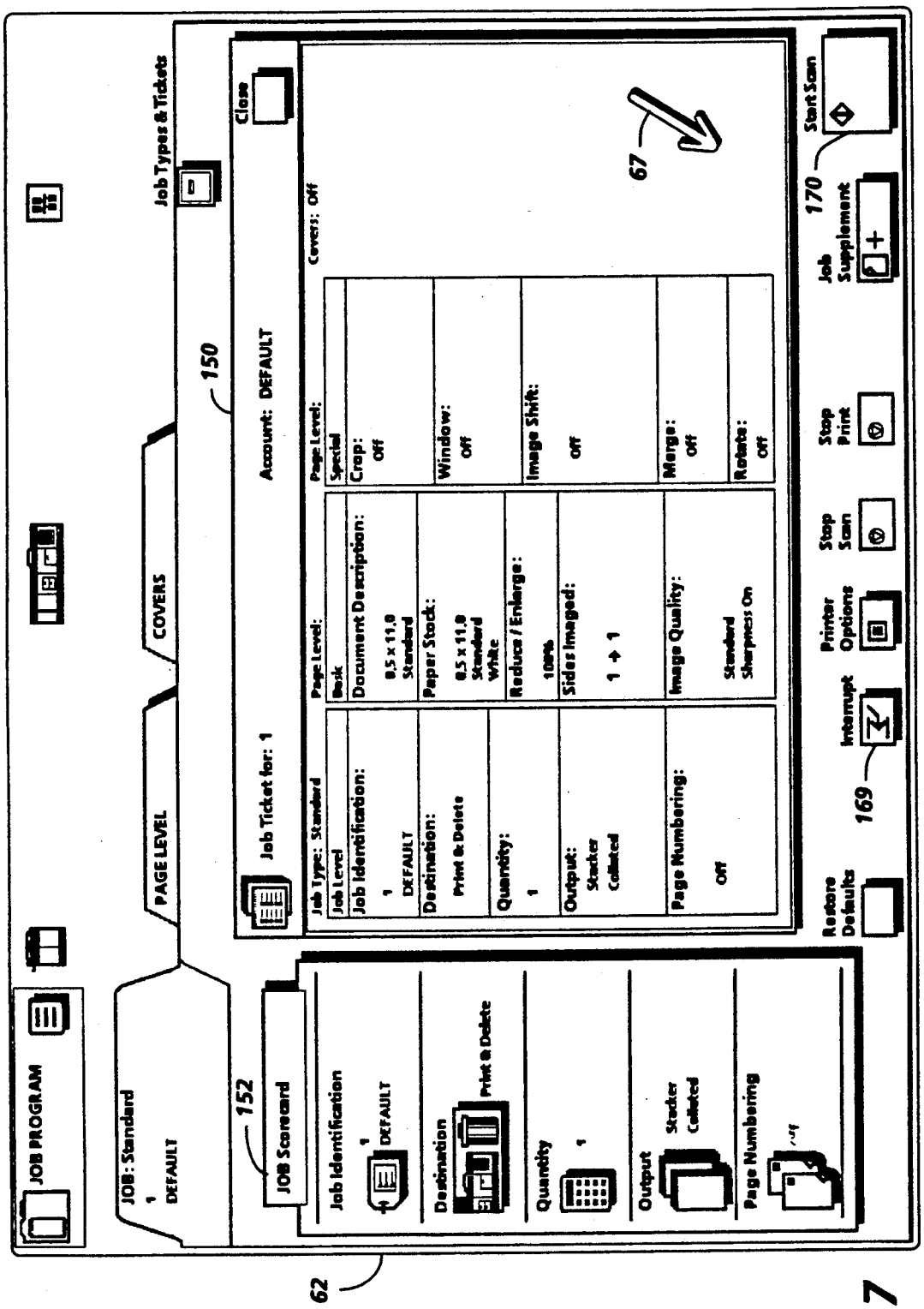
Figure 8:
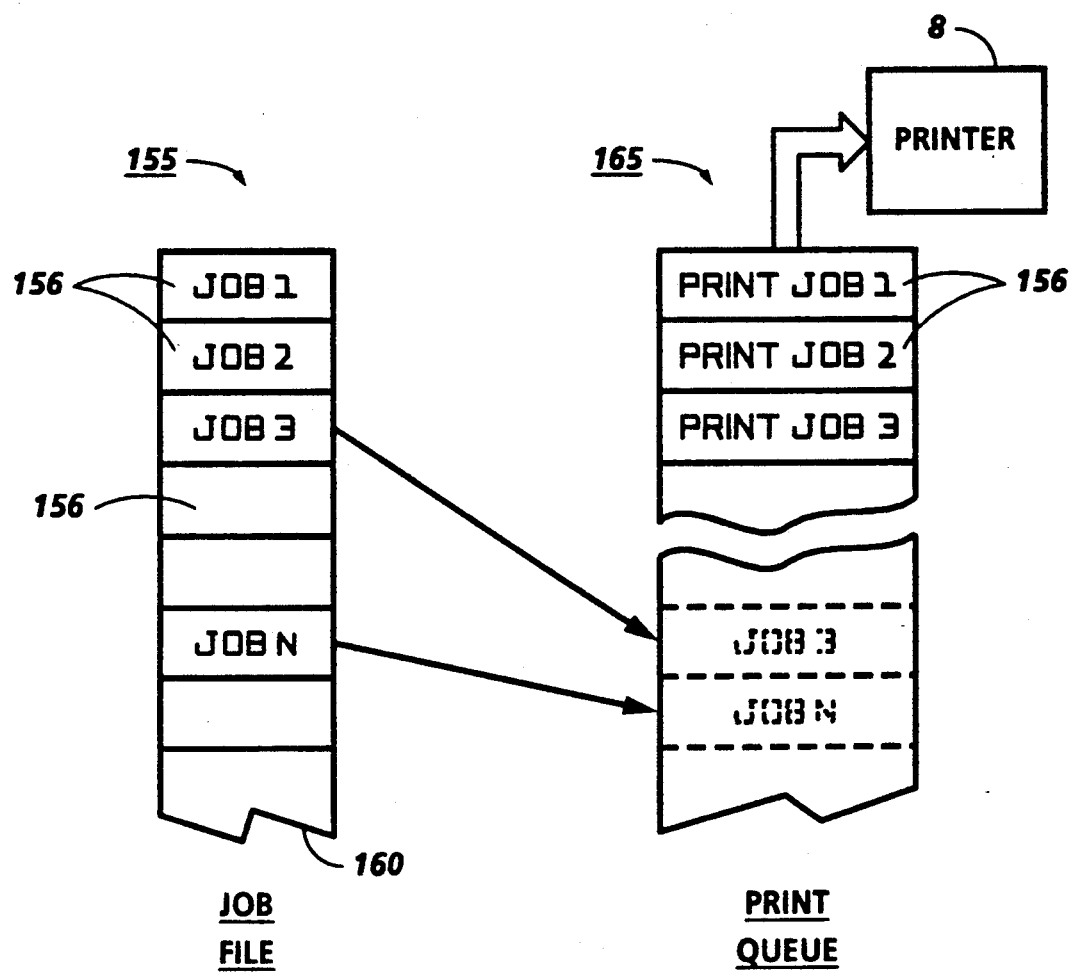
Figure 9:
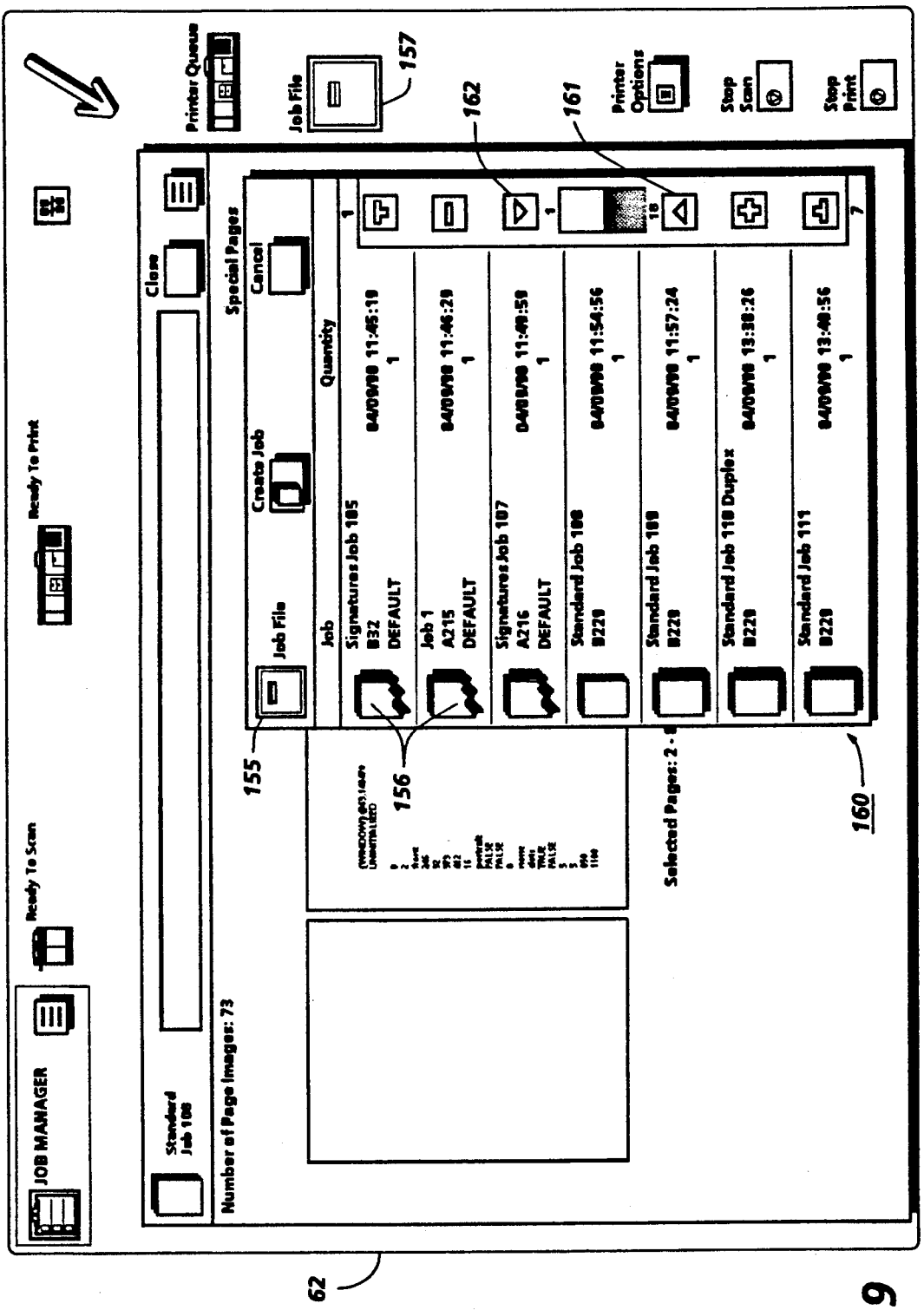
Figure 10:
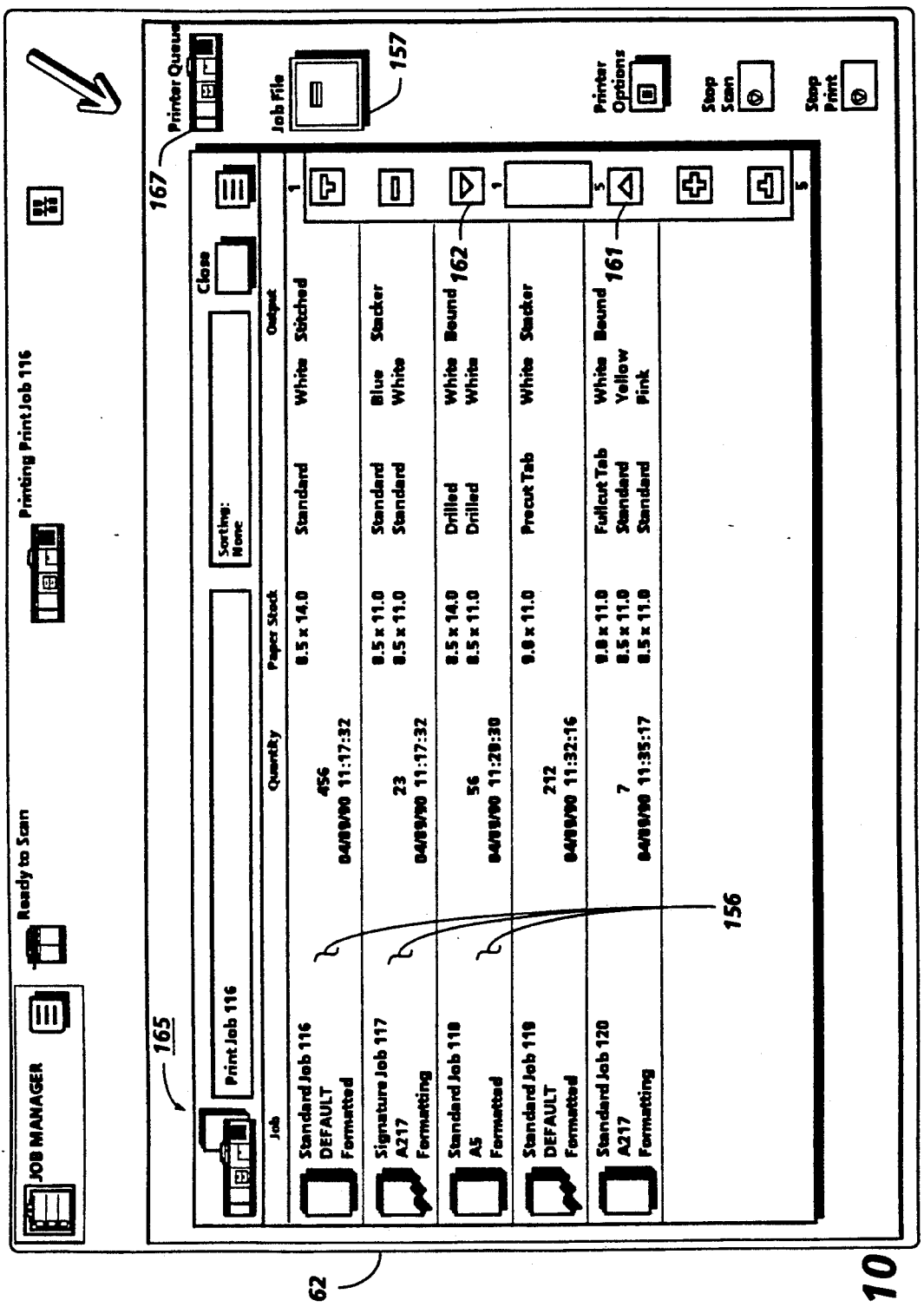
Figure 11:
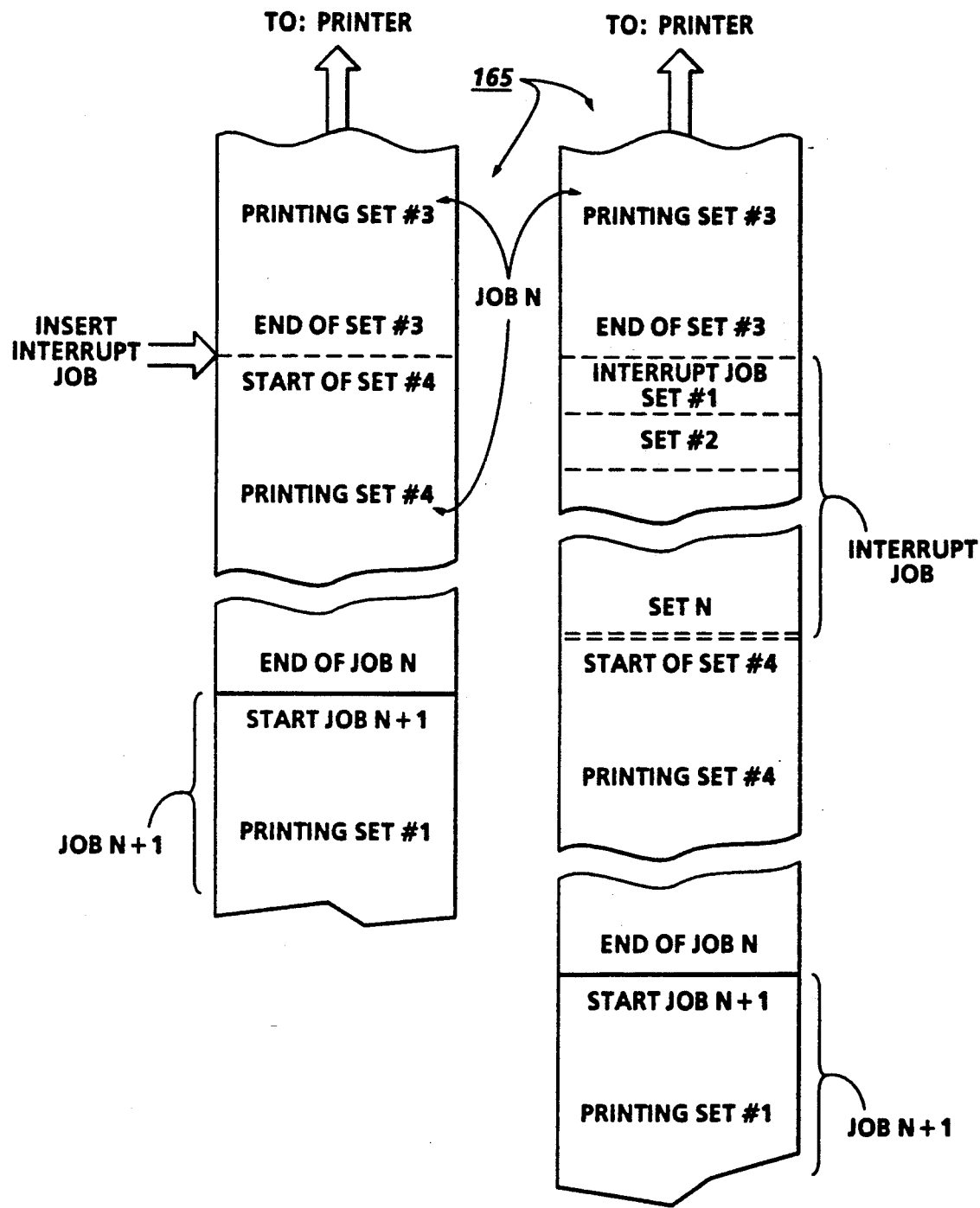
Figure 12:
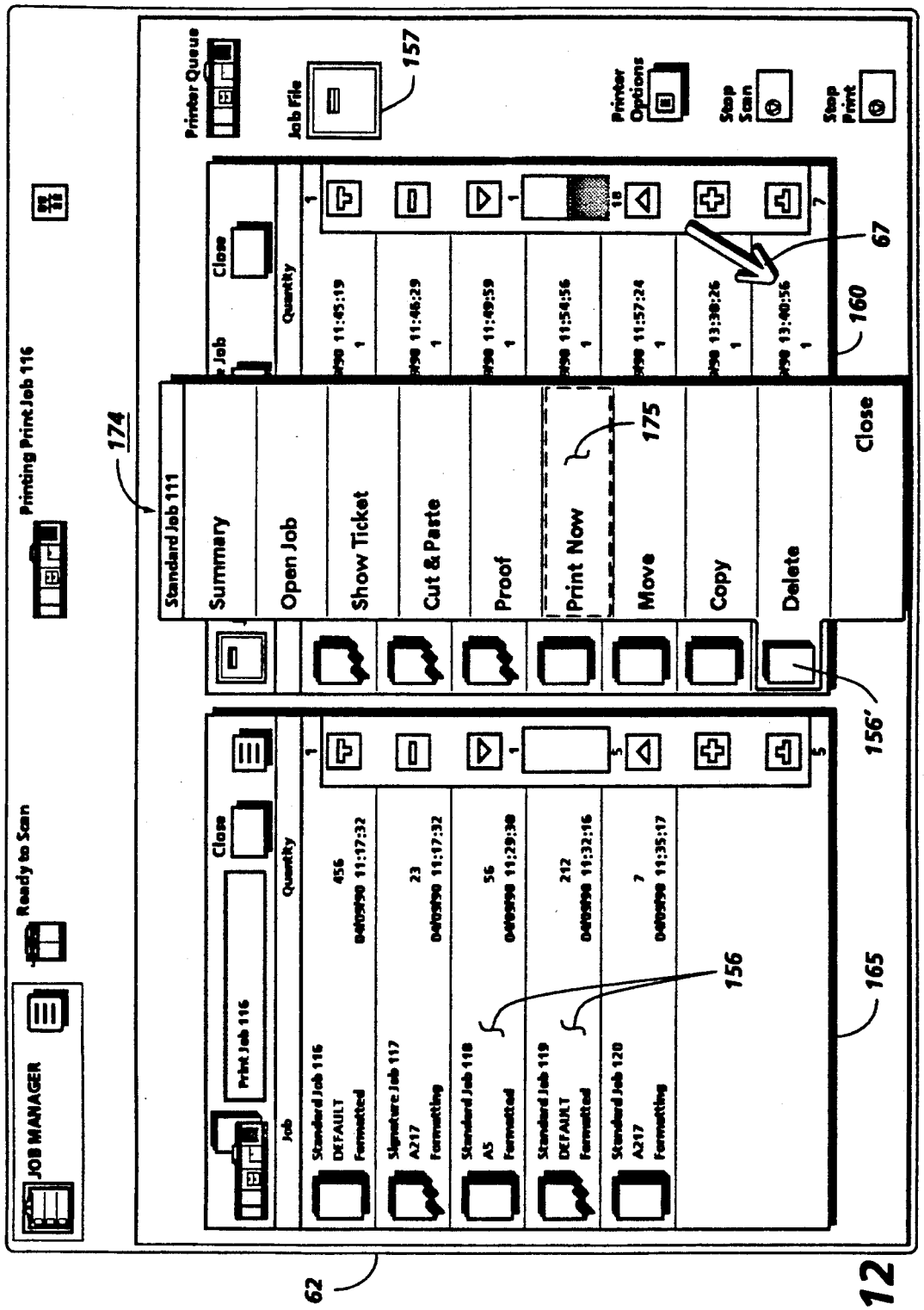

FIGS. 5A, 5B, and 5C comprise a schematic block diagram showing the major parts of the control section for the printing system shown in FIG. 1;

FIG. 6 is a block diagram of the Operating System, together with Printed Wiring Boards and shared line connections for the printing system shown in FIG. 1;

FIG. 7 is a view depicting an exemplary job programming ticket and job scorecard displayed on the User Interface (UI) touchscreen of the printing system shown in FIG. 1;

FIG. 8 is a view depicting the Job File and Print Queue;

FIG. 9 is a view of the User Interface touchscreen display depicting a queue of typical Job Files for jobs in the system;

FIG. 10 is a view of the User Interface touchscreen display depicting a print queue of typical jobs to be printed;

FIG. 11 is a view depicting the print queue before and after insertion of an interrupt job in the queue, illustrating the manner in which the job currently being printed is interrupted; and FIG. 12 is a view of the User Interface touchscreen display illustrating the manner in which a specific job in the Job File is accessed to become an interrupt job.

Figure 2:
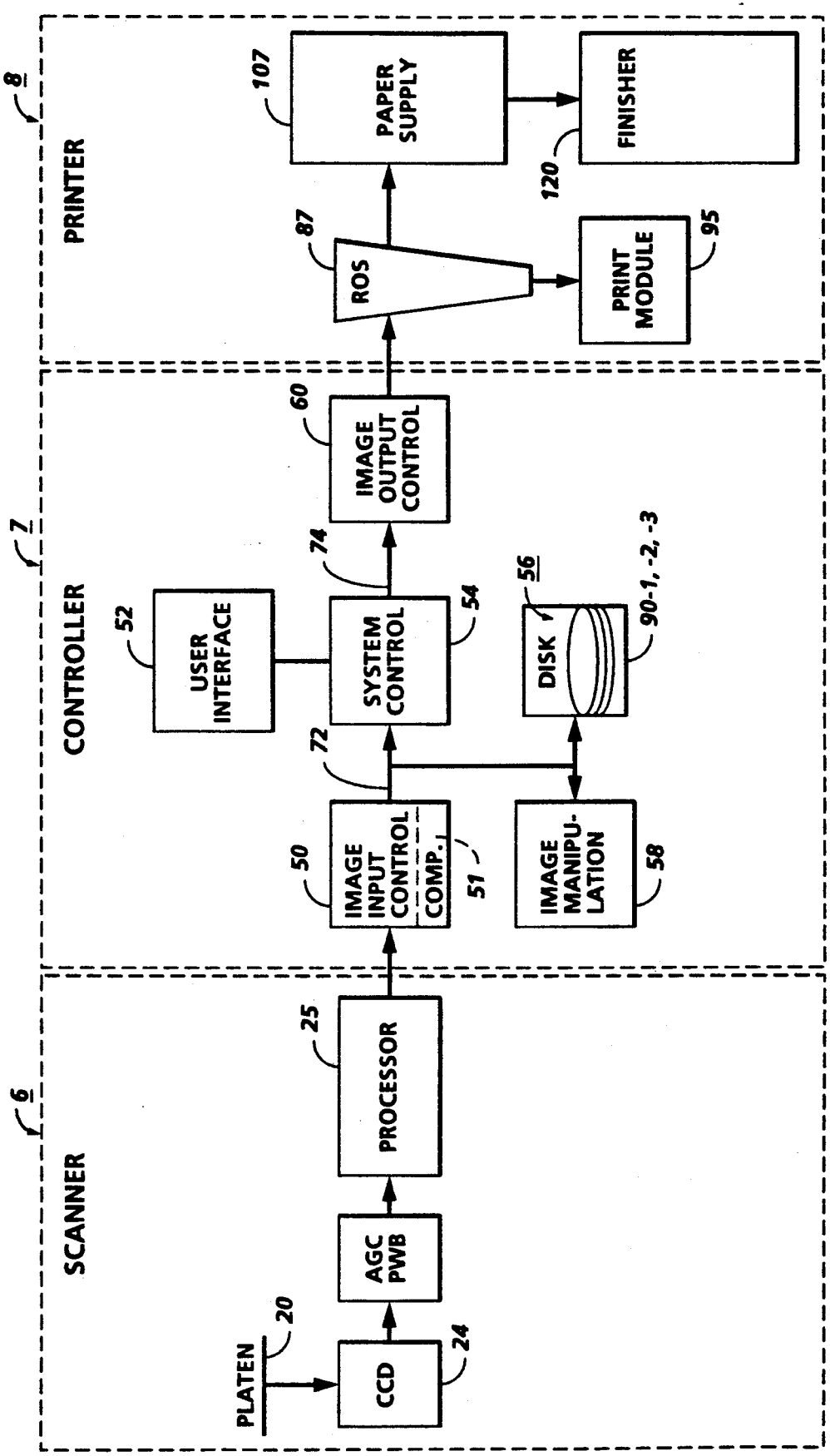
FIG. 2 is a block diagram depicting the major elements of the printing system shown in FIG. 1.

Referring to FIGS. 1 and 2, there is shown an exemplary laser based printing system 2 for processing print jobs in accordance with the teachings of the present invention. Printing system 2 for purposes of explanation is divided into a scanner section 6, controller section 7, and printer section 8. While a specific printing system is shown and described, the present invention may be used with other types of printing systems such as ink jet, ionographic, etc.

Figure 3:
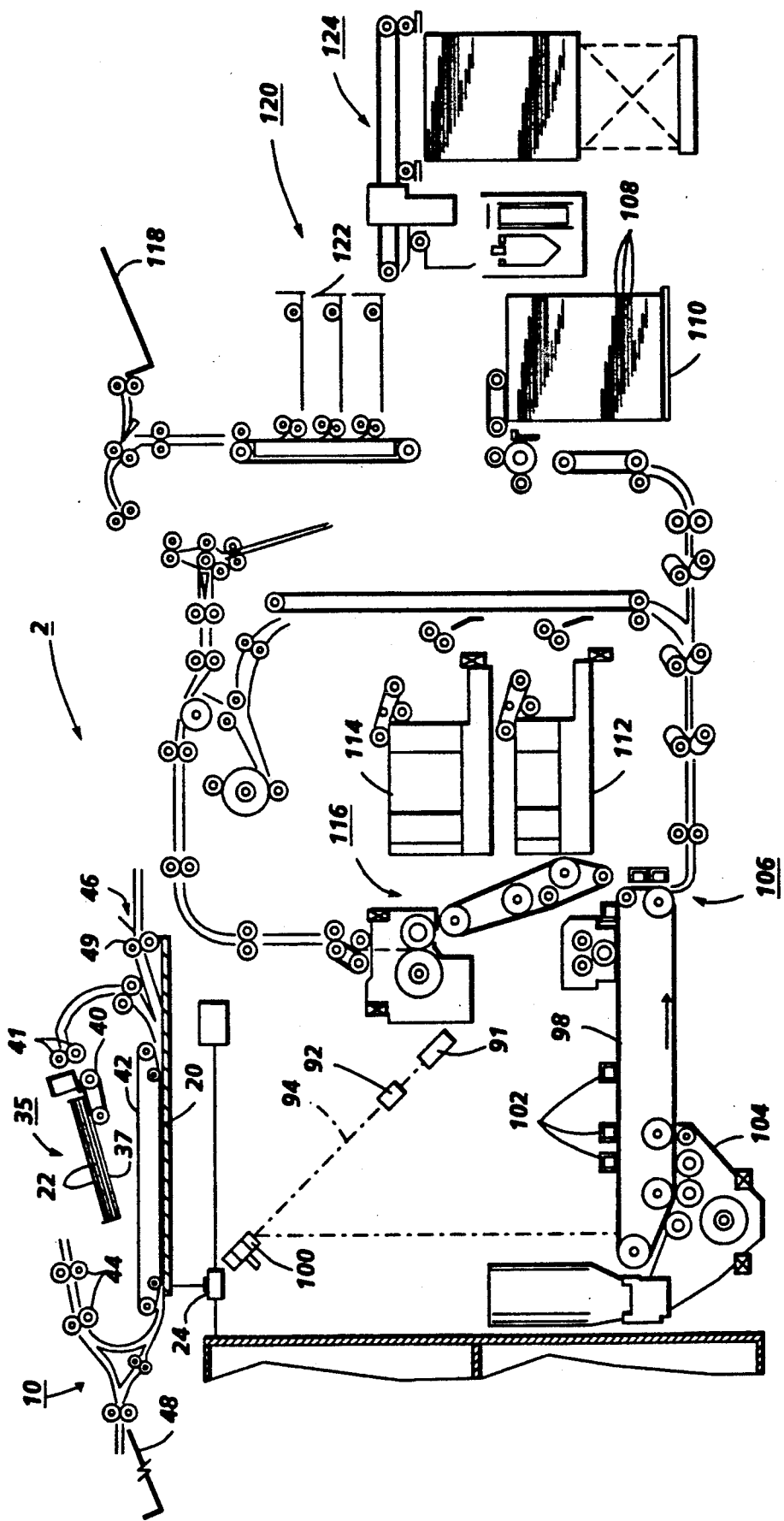
FIG. 3 is a plan view illustrating the principal mechanical components of the printing system shown in FIG. 1.
Figure 4:
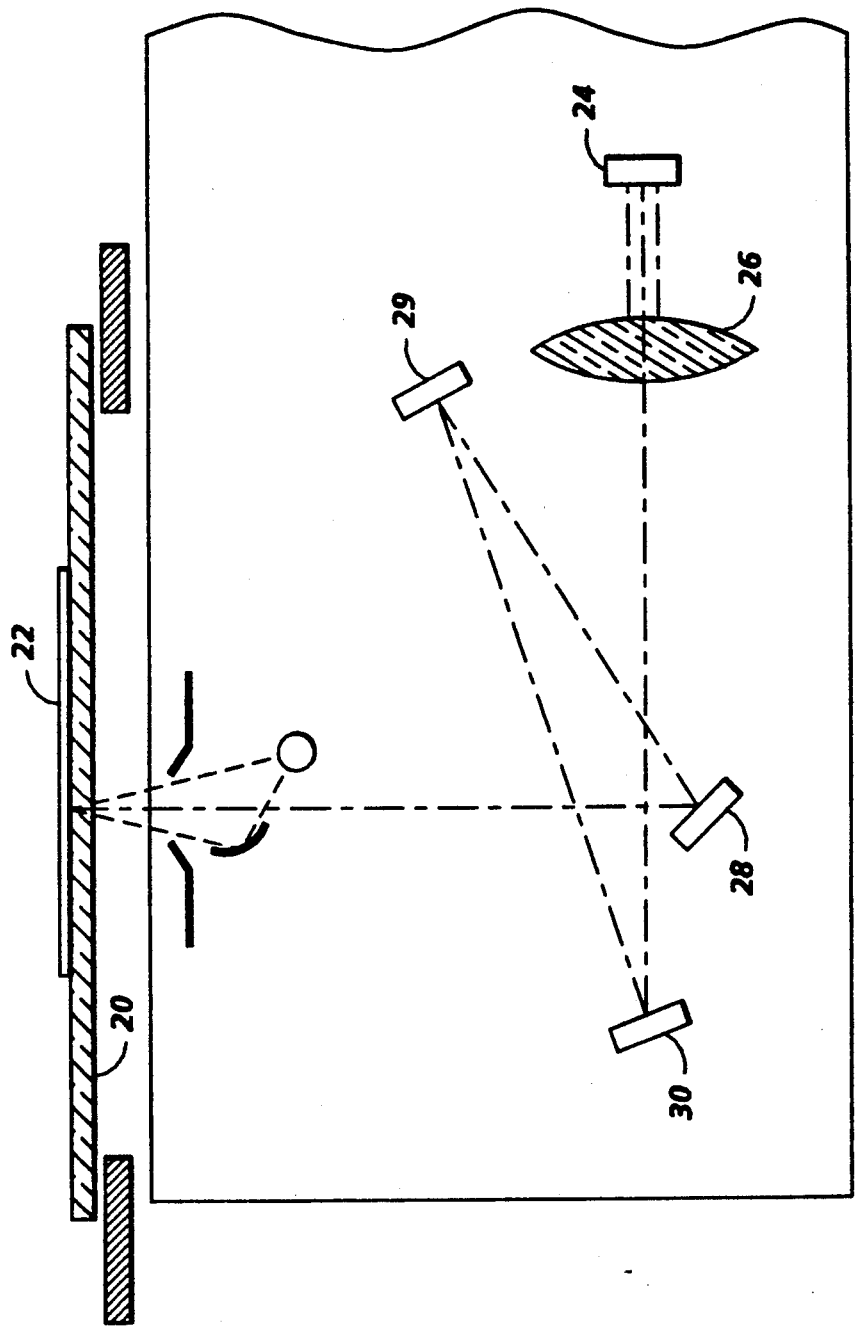
FIG. 4 is a schematic view showing certain construction details of the document scanner for the printing system shown in FIG. 1.

Referring particularly to FIGS. 2-4, scanner section 6 incorporates a transparent platen 20 on which the document 22 to be scanned is located. One or more linear arrays 24 are supported for reciprocating scanning movement below platen 20. Lens 26 and mirrors 28, 29, 30 cooperate to focus array 24 on a line like segment of platen 20 and the document being scanned thereon. Array 24 provides image signals or pixels representative of the image scanned which after suitable processing by processor 25, are output to controller section 7.

Processor 25 converts the analog image signals output by array 24 to digital and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADH) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 95 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main paper tray 110 or from auxiliary paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIGS. 1, 2 and 5, controller section 7 is, for explanation purposes, divided into an image input controller 50, User Interface (UI) 52, system controller 54, main memory 56, image manipulation section 58, and image output controller 60.

The scanned image data input from processor 25 of scanner section 6 to controller section 7 is compressed by image compressor/processor 51 of image input controller 50 on PWB (Printed Wiring Board) 70-3. As the image data passes through compressor/processor 51, it is segmented into slices N scanlines wide, each slice having a slice pointer. The compressed image data together with slice points and any related image descriptors providing image specific information (such as height and width of the document in pixels, the compression method used, points to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc are carried out. Following processing, the data may be returned to main memory 56, sent to UI 52 for display on touchscreen 62, or sent to image output controller 60.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Referring particularly to FIGS. 5A-5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Referring particularly to FIG. 6, system control signals are distributed via a plurality of printed wiring boards (PWBs). These include EDN (Electronic Data Node) core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed, while Job Scorecard 152 displays the basic instructions to the system for printing the job.

Referring to FIGS. 8 and 9, the image files are arranged in a job file 155, with the print jobs 156 numbered consecutively in the order in which the print jobs are scanned in. Where the operator wishes to see the jobs currently residing in job file 155, as for example, to select jobs to be moved to the print queue for printing, a JOB FILE icon 157 on touchscreen 62 actuated. This displays an image queue 160 of the jobs 156 currently in the job file on screen 62, an example of which is shown in FIG. 9. Each job is identified by a descriptor showing the type of job, job number, number of prints, etc. By using up and down scrolling icons 161, 162, the operator can scroll the list of jobs where the number of jobs in the job file is too large to be simultaneously displayed on touchscreen 62.

Referring also to FIG. 10, to print a job 156, the job is moved into a print queue 165. A PRINTER QUEUE icon 167 on touchscreen 62, when actuated, displays the current print queue with a list of the jobs in the queue on touchscreen 62, an example of which is shown in FIG. 10. Each job in print queue 165 has a job descriptor identifying the job, job number, quantity to be printed, paper color, finishing type, etc. Print queue 165 is ordered by priority and time of arrival of the job in the print queue. Other priority orderings may be envisioned.

Where it is desired to process a job 156 before printing as, for example, to edit a job, the image queue 160 is displayed (if not already displayed on screen 62) and the particular job identified. The parts of the image file required for the processing selected are accessed, the image data de-compressed and converted to the resolution required for display on screen 62. When processing is completed, the image data is compressed and returned to main memory 56.

A job 156 in print queue 165 may be removed from queue 165 any time before printing has commenced and returned to the job file 155. In that case, the image file removed loses its position in the print queue.

For printing a job, the image file having compressed image data, image slice pointers, and descriptors of the job is read from disks 90-1, 90-2, 90-3 of main memory 56 into system memory 61. The image data is formatted and processed in blocks called bands. Band descriptors, which provide descriptions of the objects within a page, base addresses for all of the scanlines in the band, the start addresses for each band, and the starting position for each page (i.e., page boundary) are created.

Using the image descriptors, band descriptors, and image slice pointers, packets of information, referred to as image parameter blocks containing all the information needed for the image generation processors 86 (seen in FIG. 5A) to retrieve the image data for processing and printing, are created. Processors 86 include a decoder, depredictor, and image generating logic to in effect de-compress the image data and provide the binary image data used by printer section 8 to make prints.

Following printing, the image file for the job is normally purged from memory 56 to make room for new job.

Where the operator desires to stop the job currently being scanned or printed in order to print a higher priority job (referred to as an interrupt or special job hereinafter), the interrupt function is selected. Interrupt allows the operator to process an interrupt job without having to wait for the job currently being processed to finish. At the same time, the interrupted job is saved and automatically resumed on completion of the interrupt job or jobs.

Referring to FIG. 7, the touch screen must be placed in a job program mode when the interrupt job is not in the job file and hence requires canning. The interrupt job is programmed in the same manner as any other job, i.e., jobs not of priority status previously processed by the printing system. A job identification number is assigned, the quantity to be printed selected, the output options selected, etc. The operator then selects the INTERRUPT icon 169 signaling to the system that the job is an interrupt job. If the job program calls for saving the interrupt job, the interrupt job looses its priority status following printing and the job is sent to the job file for storage with the same priority as are other jobs.

Where scanner section 6 is currently scanning in another job, scanning is interrupted in response to programming an interrupt job at the first logical point. This allows canning of the interrupt job to commence as promptly as possible. Normally, scanning is stopped when scanning of the page in process is complete except in the case where scanner section 6 is operating in the RDH mode. In that case, scanning of all the documents in the ADH is completed prior to commencing scanning of the interrupt job. Once scanning has stopped, scanning the interrupt job may begin by selecting the appropriate scanning mode and activating the START SCAN icon 170. Printing of jobs in the print queue continues until scanning of the interrupt job is complete or at least sufficient to enable printing of the interrupt job to commence.

Where the interrupt job has a relatively large number of pages, scanning is normally done by operating ADH 35 in the RDH mode. For operation in this mode, the documents 22 that comprise the interrupt job are loaded into document tray 37, ADH 35 actuated, and the documents scanned by array 24. Where the interrupt job is only a limited number of pages or consists of documents of odd sizes, the SADH mode may be used with the documents inserted one by one manually through slot 46 for scanning. Alternately, the manual mode may be used. Where the documents comprise a book, book mode scanning is used or in the case of fanfold documents, CFF mode is used. Once the interrupt job has completed scanning, scanning the previously stopped job is resumed by deselecting interrupt 169 and then selecting the start scan icon 170.

Referring particularly to FIG. 11, when scanning of the interrupt job is sufficient to allow printing to commence, the job file or so much of the job file as is completed for the interrupt job is inserted into the print queue and into the job file of the job currently being printed at the first logical point. This places the interrupt job in position to be printed not only ahead of the other jobs in the print queue but also ahead of the remainder of the interrupted job which is represented in the job file as having page boundaries as described above. On detection of the job file for the interrupt job, printer section 8 stops the job currently being printed at the earliest logical point and starts printing the interrupt job. For example, where the job currently being printed is programmed for set (i.e., 1-n, 1-n, 1-n, etc.), stopping occurs at the end of the set in process. Where the job is uncollated (i.e., n copies of page 1, n copies of page 2, etc.), stopping occurs when the last print of the page being printed is made.

For printing, the image data pages for the interrupt job are accessed in main memory 56, decompressed, and converted to binary image data for printing. Concurrently, image parameter blocks are generated with printing instructions for the specific interrupt job as described previously.

Where the parameters of the interrupt job require a function that the printer is currently unable to perform (i.e., a different type of paper than is currently loaded in the paper trays), the system assumes a NOT READY state and printing is inhibited. A message is displayed on touchscreen 62 informing the operator of the problem. The system will remain in the, inhibiting restarting of the printer, until either the deficiency is corrected or the interrupt job request canceled.

On completion of printing of the interrupt job, or in the event that the request for an interrupt job is canceled, the system reverts back to the job previously being printed, resuming printing of that job at the point where the job was stopped. Where changes in the system made to accommodate the interrupt job result in an inability of the system to now carry on the stopped job, the system assumes a NOT READY state, and further printing is prevented until the problem is rectified.

In cases where the job currently being printed is itself an interrupt job, the next interrupt job is restricted such that it will be placed in print queue 165 immediately after the previously programmed interrupt job. Interrupt jobs are handled on a first-in-first-out basis and cannot be reordered. Similarly, where several interrupt jobs are in print queue 165, each new interrupt job is placed in the queue after the last interrupt job entered. In other words, interrupt jobs are positioned in print queue 165 in first-in-first-out order and restricted such that they cannot be re-ordered. If a special interrupt job is being processed when a second interrupt job is requested, the system will inhibit interruption of the special job being processed and the second job will be placed in print queue 165 accordingly.

Referring to FIG. 12, where it is desired to make a job already in job file 155 interrupt, the image queue 160 is displayed on touchscreen 62 in the manner described earlier above. The job to be made interrupt is highlighted. This causes a selection file 174 with that job number to be displayed on touchscreen 62. Included in the selections contained in file 174 is a PRINT NOW icon 175. Actuating the PRINT NOW icon 175 moves the interrupt job from the image queue 160 into the print queue 165 as a interrupt job. It is understood that the interrupt job can be a previous job stored in its entirety or a new job made up from select pages of another job or jobs.

The job currently being printed (except in the case of another interrupt job) is stopped at a logical point. As described heretofore, the interrupt job is inserted in print queue 165 ahead of the remainder of the stopped job and before the other jobs in the print queue (except in the case where the job in process and the jobs waiting in the print queue are themselves interrupt jobs). Following printing of the last set required for the interrupt job, the stopped job is resumed.

While the invention has been described with reference to the structure disclosed, it is not confined to the details set forth, but is intended to cover such modifications or changes as may come within the scope of the following claims.

We claim:

1. A method for producing prints from an interrupt job in a printing apparatus having a printing device responsive to electronic imaging signals and a print queue containing a plurality of print jobs in a preselected job file succession with each of the print jobs including electronic imaging signals representative of image information on a document and corresponding printing instructions for performing the print job, comprising the steps of:

producing prints for the corresponding electronic imaging signals of each successive print job in the print queue in response to processing of printing instructions from the print jobs in the print queue;

forming the interrupt job by programming printing instructions for the interrupt job, providing electronic imaging signals representative of image information on a document with a plurality of pages, and combining the printing instructions with the electronic imaging signals;

interrupting the job file succession in the print queue for inserting the interrupt job at a selected location in the job file succession for printing the interrupt job at an earliest logical point and interrupting the print job currently being printed when the printer detects the interrupt job;

reprogramming the printing apparatus with the printing instructions of the interrupt job;

producing prints of the interrupt job in response to the reprogrammed printing instructions;

deleting the interrupt job once the interrupt job has been printed completely unless the printing instructions of the interrupt job indicate that the interrupt job should be saved;

reprogramming the printing apparatus with the printing instructions for the interrupted job upon detecting the completion of printing of the interrupt job; and resuming printing of the interrupted print job when a current operating mode of the printing device is compatible with the printing instructions for the interrupt job.

2. The method of claim 1, wherein the step of providing electronic imaging signals representative of the image information on the document comprises the step of scanning the document to obtain the electronic imaging signals representative of the image information on the document.

3. The method of claim 1, further comprising the step of providing a job file containing a job and designating the job as the interrupt job wherein the step of interrupting the job file succession comprises moving the interrupt job from the job file to a selected location in the job file succession of the print queue.

4. The method of claim 1, further comprising the step of forming a plurality of interrupt jobs and inserting all of the interrupt jobs in a first-in-first-out order in the print queue ahead the plurality of print jobs.

5. The method of claim 4, further comprising the step of inhibiting re-ordering of the interrupt jobs in the print queue.

6. The method of claim 1, further comprising:
forming a second interrupt job, each of the first and second interrupt job having a beginning and an end; and
inserting the second interrupt job in the print queue at the end of the first interrupt job while the the first interrupt job is being printed.

7. The method of claim 1, wherein the step of interrupting comprises the steps of detecting the interrupt job and interrupting the print job currently being printed at an earliest logical point in the interrupted print job.

8. The method of claim 1, in which the interrupted print job includes a set of adjacent page boundaries, wherein the step of interrupting the job file succession includes interposing the interrupt job between the adjacent page boundaries.

9. The method of claim 1, wherein the step of resuming printing of the interrupted print job further comprises the step of inhibiting resuming of printing by the printing device when the current operating mode of the printing device is incompatible with the printing instructions for the interrupt job.

10. The method of claim 1 in which at least two adjacently located print jobs are separated by boundaries, wherein the step of interrupting the job file succession comprises placing the interrupt job between the page boundaries.

11. The method of claim 1, further comprising:
forming a second interrupt job;
printing the first interrupt job prior to the second interrupt job; and
inhibiting interrupting of the first interrupt job by the second interrupt job.

12. A printing apparatus having a print queue containing a plurality of print jobs in a preselected order with each of the print jobs including electronic imaging signals representative of one or more documents and corresponding printing instructions for performing the print job, comprising:
a printing device to make prints for the corresponding electronic imaging signals of each successive print job in the print queue in response to processing of printing instructions from the print jobs in the print queue;
means for creating a job having printing instructions and electronic imaging signals representative of image information on a document;
a job file for retaining a plurality of printable jobs in a selected order with one of the printable jobs being the created job;
means for designating the created job as an interrupt job and electronically placing the interrupt job at a selected location in the print queue without altering the selected order of said job file; and
means for interrupting printing of the print jobs to make prints of the electronic imaging signals representative of the image information on the document for the interrupt job in accordance with the printing instructions of the interrupt job wherein upon completing printing of the interrupt job, the printing of the interrupted print job can be resumed.

13. The apparatus of claim 12, wherein said printing device comprises a raster output scanning device for printing a selected one of the print jobs and the interrupt job.

14. The apparatus of claim 12, wherein said means for creating comprises a device for scanning a document to generate the electronic signals representative of the image on the document.

* * * * *